US012604271B2

(12) United States Patent
Zhou et al.

(10) Patent No.: US 12,604,271 B2
(45) Date of Patent: Apr. 14, 2026

(54) METHOD FOR PHYSICAL LAYER MONITORING AND RELATED APPARATUSES

(71) Applicant: SPREADTRUM COMMUNICATIONS (SHANGHAI) CO., LTD., Shanghai (CN)

(72) Inventors: Huayu Zhou, Shanghai (CN); Sicong Zhao, Shanghai (CN); Zhenzhu Lei, Shanghai (CN); Zhengang Pan, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 402 days.

(21) Appl. No.: 18/249,292

(22) PCT Filed: Oct. 15, 2021

(86) PCT No.: PCT/CN2021/124104
§ 371 (c)(1),
(2) Date: Apr. 17, 2023

(87) PCT Pub. No.: WO2022/078496
PCT Pub. Date: Apr. 21, 2022

(65) Prior Publication Data
US 2023/0403719 A1     Dec. 14, 2023

(30) Foreign Application Priority Data
Oct. 16, 2020     (CN) ........................... 202011112926.1

(51) Int. Cl.
*H04W 52/02*       (2009.01)
*H04W 72/232*      (2023.01)

(52) U.S. Cl.
CPC ... *H04W 52/0235* (2013.01); *H04W 52/0216* (2013.01); *H04W 52/0229* (2013.01); *H04W 72/232* (2023.01)

(58) Field of Classification Search
CPC ........... H04W 72/232; H04W 52/0235; H04W 52/0216; H04W 52/0229; Y02D 30/70; H04L 5/00; H04L 5/0053
See application file for complete search history.

(56) References Cited

U.S. PATENT DOCUMENTS

2015/0085805 A1     3/2015   Li et al.
2021/0007050 A1*    1/2021   Lin ........................ H04W 76/28
(Continued)

FOREIGN PATENT DOCUMENTS

CN         106454901 A      2/2017
CN         110381568 A      10/2019
(Continued)

OTHER PUBLICATIONS

Xue et al., "Wireless Communication Method, Terminal Device, Network Device, and Network System", Nov. 5, 2020, WO, WO 2020221329 (Year: 2020).*
(Continued)

*Primary Examiner* — Michael K Phillips
(74) *Attorney, Agent, or Firm* — HAUPTMAN HAM, LLP

(57)     ABSTRACT

A method for physical layer monitoring and related apparatuses are provided in implementations of the disclosure, where the method and the related apparatuses are applied to a user equipment (UE). The method includes: determining a monitor mode for a type-1 physical downlink control channel (PDCCH) according to a type-1 wakeup indication; or determining the monitor mode for the type-1 PDCCH according to a type-2 wakeup indication; or determining the
(Continued)

DETERMINE A MONITOR MODE FOR A TYPE-1 PDCCH ACCORDING TO A TYPE-1 WAKEUP INDICATION, WHERE THE TYPE-1 PDCCH IS A PDCCH FOR A HEARTBEAT TRAFFIC     / S101 monitor mode for the type-1 PDCCH according to a type-1 PDCCH skipping indication; or determining the monitor mode for the type-1 PDCCH according to a type-2 PDCCH skipping indication.

10 Claims, 2 Drawing Sheets

(56) References Cited

U.S. PATENT DOCUMENTS

| | | | | |
|---|---|---|---|---|
| 2021/0051589 A1* | 2/2021 | Nam | ................. | H04W 52/0216 |
| 2021/0185609 A1* | 6/2021 | Zhou | ................. | H04W 52/0206 |
| 2021/0266135 A1* | 8/2021 | Fu | ......................... | H04L 1/0025 |
| 2022/0201516 A1* | 6/2022 | Guo | ...................... | H04W 24/08 |
| 2022/0224486 A1* | 7/2022 | Luo | ................... | H04W 52/0235 |
| 2023/0098013 A1* | 3/2023 | Ma | ........................ | H04W 24/08 |
| | | | | 370/329 |

FOREIGN PATENT DOCUMENTS

| | | | | |
|---|---|---|---|---|
| CN | 110913460 | A | 3/2020 | |
| CN | 111294902 | A | 6/2020 | |
| CN | 111315002 | A | 6/2020 | |
| CN | 111344993 | A | 6/2020 | |
| CN | 111432460 | A | 7/2020 | |
| WO | 2020043139 | A1 | 3/2020 | |
| WO | WO-2020221329 | A1 * | 11/2020 | .......... H04L 1/0038 |

OTHER PUBLICATIONS

An Overview of Physical Downlink Control Channel for 5G New Radio, IEEE Communications Standards Magazine, Sep. 23, 2020 (Year: 2020).*
WIPO, International Search Report and Written Opinion for International Application No. PCT/CN2021/124104, Jan. 7, 2022.
First Office Action issued in corresponding CN application No. 202011112926.1 dated Mar. 7, 2024.
Second Office Action issued in corresponding CN application No. 202011112926.1 dated Jan. 15, 2025.
Qualcomm Inc et al., "Indication in wakeup signal for PDCCH monitoring in SCells" 3GPP TSG-RAN WG2 Meeting #106 R2-1908077 dated Apr. 13-May 17, 2019.
Notification of grant of patent right for invention issued in corresponding CN application No. 202011112926.1 dated Apr. 28, 2025.

* cited by examiner

Figures 1, 2, 3, 4:
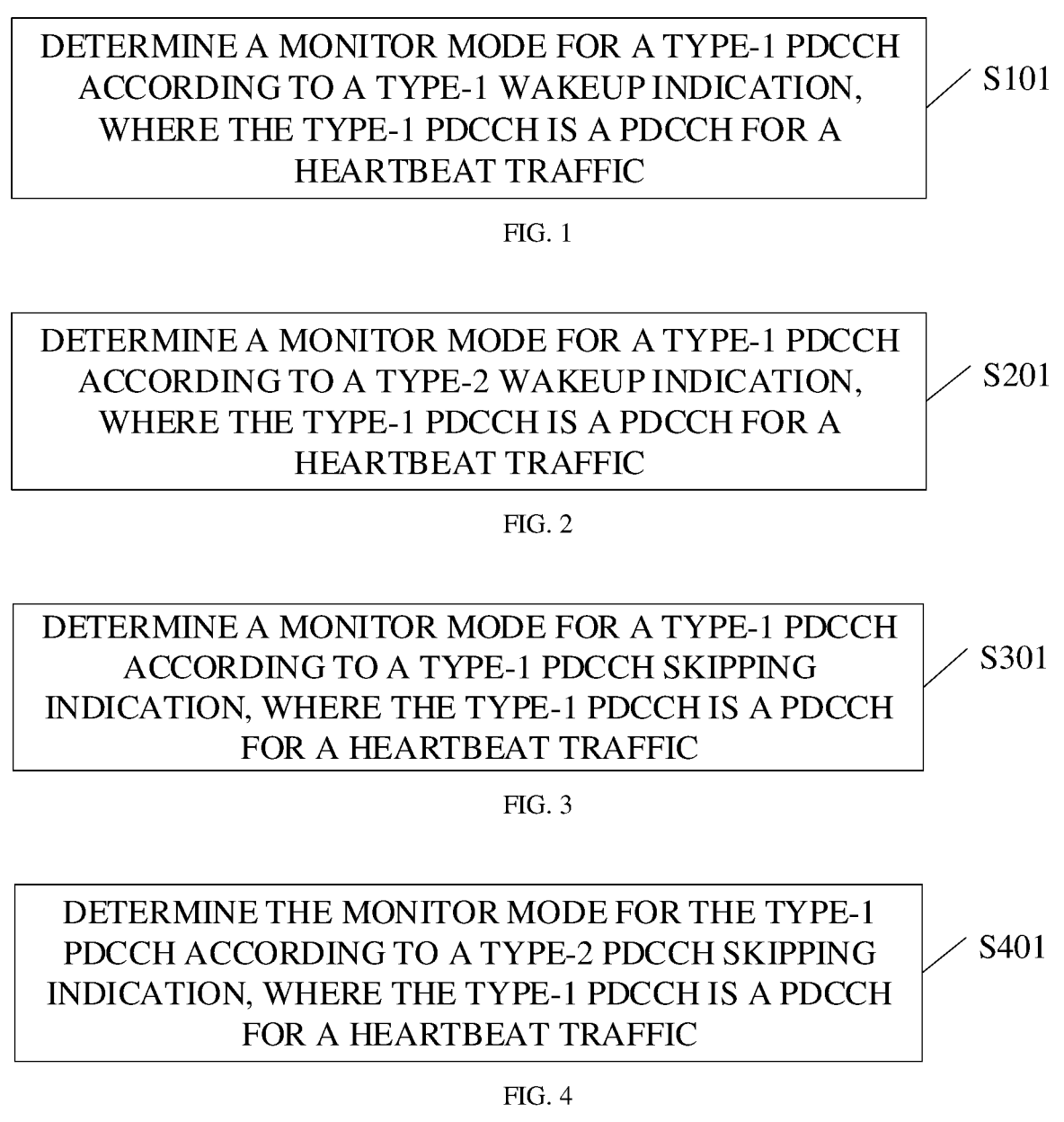

DETERMINE A MONITOR MODE FOR A TYPE-1 PDCCH ACCORDING TO A TYPE-1 WAKEUP INDICATION, WHERE THE TYPE-1 PDCCH IS A PDCCH FOR A HEARTBEAT TRAFFIC

DETERMINE A MONITOR MODE FOR A TYPE-1 PDCCH ACCORDING TO A TYPE-2 WAKEUP INDICATION, WHERE THE TYPE-1 PDCCH IS A PDCCH FOR A HEARTBEAT TRAFFIC

DETERMINE A MONITOR MODE FOR A TYPE-1 PDCCH ACCORDING TO A TYPE-1 PDCCH SKIPPING INDICATION, WHERE THE TYPE-1 PDCCH IS A PDCCH FOR A HEARTBEAT TRAFFIC

DETERMINE THE MONITOR MODE FOR THE TYPE-1 PDCCH ACCORDING TO A TYPE-2 PDCCH SKIPPING INDICATION, WHERE THE TYPE-1 PDCCH IS A PDCCH FOR A HEARTBEAT TRAFFIC

METHOD FOR PHYSICAL LAYER MONITORING AND RELATED APPARATUSES

CROSS-REFERENCE TO RELATED APPLICATION(S)

This application is a National Stage of International Application No. PCT/CN2021/124104, field Oct. 15, 2021, which claims priority to Chinese Patent Application No. 202011112926.1, filed Oct. 16, 2020, the entire disclosure of which are hereby incorporated by reference.

TECHNICAL FIELD

This disclosure relates to the field of communication technology, and in particular, to a method for physical layer monitoring and related apparatuses.

BACKGROUND

Heartbeat traffics generally mean that clients transmit application-layer messages to servers to indicate to the servers that current services are active. Generally speaking, the heartbeat traffic is a small packet service with a long period, where the long period means that the message transmission can be performed once every few minutes, and the small packet means that a data packet transmitted once is relatively small, such as hundreds or thousands of bytes. In the internet of things or some wearable-device scenarios, the heartbeat traffic is a relatively common service for the sake of power saving and typical application requirements. Since the heartbeat traffic is a small packet service with a long period, the user equipment (UE) does not need to transmit a scheduling request (SR) to apply for uplink (UL) grant from the network, and the UE obtains the UL grant by monitoring a physical downlink control channel (PDCCH) on a configured PDCCH monitoring occasion (MO), so that the SR can be omitted, and power consumption of the UE can be reduced.

In the fifth generation (5G) new radio (NR) release 16 (Rel-16), a downlink control information format 2-6 (DCI format 2-6) is introduced. The UE may be configured with a 1-bit wakeup indication in the DCI format 2-6 through a higher-layer parameter, where the 1-bit wakeup indication indicates whether the UE starts an on duration timer (ODT) in the next discontinuous reception cycle (DRX cycle). The operating time of the ODT is a kind of active times (AT), and in the AT, the UE needs to monitor all valid PDCCHs, that is, a medium access control (MAC) entity controls a physical layer to monitor all valid PDCCHs.

Since the wakeup indication and a PDCCH for the heartbeat traffic coexist in a system, whether the wakeup indication has an impact on the PDCCH for the heartbeat traffic and how the wakeup indication affects the PDCCH for the heartbeat traffic are hot issues that need to be solved urgently.

In addition, since a PDCCH skipping indication and the PDCCH for the heartbeat traffic also coexist in the system, whether the PDCCH skipping indication has an impact on the PDCCH for the heartbeat traffic and how the PDCCH skipping indication affects the PDCCH for the heartbeat traffic also are hot issues that need to be solved urgently.

SUMMARY

In a first aspect, a method for physical layer monitoring is provided in implementations of the disclosure. The method is applied to a user equipment (UE) and includes: determining a monitor mode for a type-1 PDCCH according to a type-1 wakeup indication; or determining the monitor mode for the type-1 PDCCH according to a type-2 wakeup indication; or determining the monitor mode for the type-1 PDCCH according to a type-1 PDCCH skipping indication; or determining the monitor mode for the type-1 PDCCH according to a type-2 PDCCH skipping indication.

In a second aspect, a UE is provided in implementations of the disclosure. The UE includes a processor, a memory, a communication interface, and one or more programs. The one or more programs are stored in the memory and configured to be executed by the processor. The one or more programs include instructions configured to perform the operations in the first aspect of implementations of the disclosure.

In a third aspect, a non-transitory computer-readable storage medium is provided in implementations of the disclosure. The non-transitory computer-readable storage medium stores computer programs for electronic data interchange (EDI), where the computer programs are operable with a computer to perform part or all of the operations described in the first aspect of implementations of the disclosure.

BRIEF DESCRIPTION OF THE DRAWINGS

To describe technical solutions in implementations of the disclosure or the related art more clearly, the following will give a brief introduction to accompanying drawings required for describing implementations or the related art. Apparently, the accompanying drawings hereinafter described are merely some implementations of the disclosure. Based on these accompanying drawings, those of ordinary skill in the art can also obtain other drawings without creative effort.

FIG. 1 is a schematic flowchart illustrating a method for physical layer monitoring provided in implementations of the disclosure.

FIG. 2 is a schematic flowchart illustrating another method for physical layer monitoring provided in implementations of the disclosure.

FIG. 3 is a schematic flowchart illustrating another method for physical layer monitoring provided in implementations of the disclosure.

FIG. 4 is a schematic flowchart illustrating another method for physical layer monitoring provided in implementations of the disclosure.

DETAILED DESCRIPTION

Figure 5:
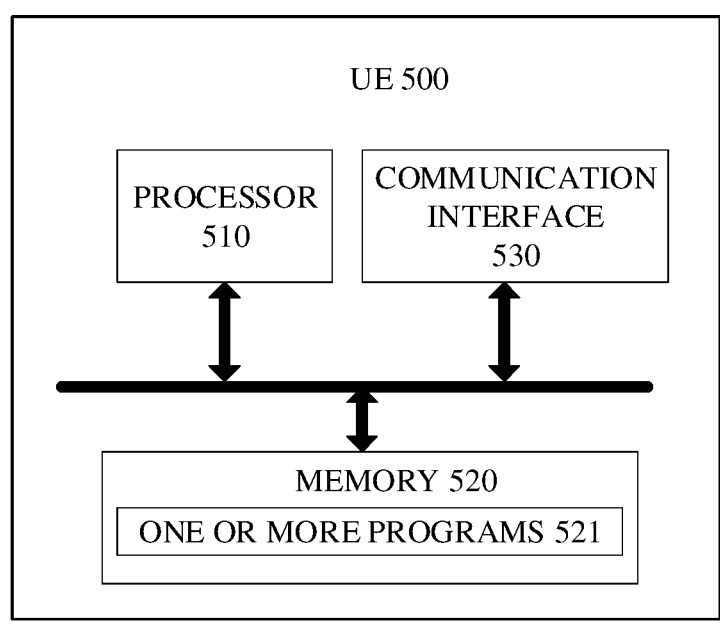
FIG. 5 is a schematic structural diagram of a user equipment (UE) provided in implementations of the disclosure.

The terms "first", "second", and the like used in the specification, the claims, and the accompany drawings of the disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, it can optionally include other operations or units that are not listed; alternatively, other operations or units inherent to the process, method, product, or device can be included either.

The term "implementation" or "embodiment" referred to herein means that a particular feature, structure, or feature described in conjunction with the implementation or embodiment may be contained in at least one implementation of the disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

To facilitate better understanding of solutions of the disclosure by those skilled in the art, the technical solutions in implementations of the disclosure are clearly and completely described hereinafter with reference to the accompanying drawings in the implementations of the disclosure. Apparently, the described implementations are merely part of rather than all of the implementations of the disclosure. All other implementations obtained by those of ordinary skill in the art based on the implementations provided herein without creative efforts shall fall within the scope of the disclosure.

A user equipment (UE) described in implementations of the disclosure may include a smart phone (such as an Android® phone, an iOS® phone, or a Windows® Phone), a tablet computer, a palmtop computer, a notebook computer, a video matrix, a monitoring platform, a mobile internet device (MID), a wearable device, etc. The above is only an example and not an exhaustive list, and the UE includes, but is not limited to, the above apparatuses. The above UE may also be a user device, such as a cloud user device.

The following will describe in detail implementations of the disclosure.

FIG. 1 is a schematic flowchart illustrating a method for physical layer monitoring provided in implementations of the disclosure, where the method for physical layer monitoring is applied to a UE. As illustrated in FIG. 1, the method for physical layer monitoring includes the following.

S101, determine a monitor mode for a type-1 physical downlink control channel (PDCCH) according to a type-1 wakeup indication, where the type-1 PDCCH is a PDCCH for a heartbeat traffic.

A base station may configure a dedicated PDCCH for the heartbeat traffic. The PDCCH is generally configured through a search space set, and thus in fact, the base station may configure a search space set for the heartbeat traffic, and a PDCCH candidate in the search space set may be regarded as the type-1 PDCCH. The type-1 PDCCH described herein may also be equivalent to a type-1 search space set.

The PDCCH or the search space set for the heartbeat traffic may be represented by a parameter in higher-layer parameters of the search space set, that is, the PDCCH or the search space set for the heartbeat traffic is identified by an information element. That is to say, the PDCCH (search space set) for the heartbeat traffic can be distinguished from other PDCCHs (search space sets) through a parameter in the higher-layer parameters of the search space set. In the disclosure, the PDCCH (search space set) for the heartbeat traffic is classified as the type-1 PDCCH (search space set).

The type-1 wakeup indication is a wakeup indication in a downlink control information format 2-6 (DCI format 2-6). The monitor mode for the type-1 PDCCH is determined according to the type-1 wakeup indication, where the monitor mode includes monitoring the type-1 PDCCH and not monitoring the type-1 PDCCH.

It can be seen that with the method for physical layer monitoring and related apparatuses described in implementations of the disclosure, where the method and the related apparatuses are applied to the UE, the UE determines the monitor mode for the type-1 PDCCH according to the type-1 wakeup indication. Since the wakeup indication and the PDCCH for the heartbeat traffic coexist in a system, and the PDCCH skipping indication and the PDCCH for the heartbeat traffic also coexist in the system, the PDCCH for the heartbeat traffic is classified as the type-1 PDCCH, and the monitor mode for the type-1 PDCCH is further determined, which is conducive to solving the coexistence problem of the wakeup indication and the PDCCH for the heartbeat traffic, and the coexistence problem of the PDCCH skipping indication and the PDCCH for the heartbeat traffic.

In a possible implementation, the monitor mode for the type-1 PDCCH is determined according to the type-1 wakeup indication as follows. A value of the type-1 wakeup indication is determined, where the type-1 wakeup indication includes one bit. If the value of the type-1 wakeup indication is a first value which can also be referred to as a value A, it is determined that the monitor mode for the type-1 PDCCH is to monitor the type-1 PDCCH.

The type-1 wakeup indication includes one bit, and said one bit of the type-1 wakeup indication may not act on monitoring of the type-1 PDCCH. In the related art, if the value of the type-1 wakeup indication is 0, the UE may continue to monitor the type-1 PDCCH, and the UE does not start an on duration timer (ODT) and thus not monitor all valid PDCCHs within a corresponding duration. However, considering that the heartbeat traffic corresponding to the type-1 PDCCH is a small packet service with a long period, the heartbeat traffic needs to be processed differently. Therefore, when the UE needs to monitor only the type-1 PDCCH within an active time (AT), the base station still needs to start the ODT to make the UE monitor other PDCCHs except the type-1 PDCCH in the AT, which will lead to more power consumption of the UE. If the type-1 wakeup indication is to start the ODT, the UE will monitor the type-1 PDCCH and other PDCCHs except the type-1 PDCCH.

The first value being 0 indicates that the value of the type-1 wakeup indication received by the UE is 0, and when the value of the type-1 wakeup indication is 0, it can be determined that the monitor mode for the type-1 PDCCH is to monitor the type-1 PDCCH, and in this case, the ODT is not started, and other PDCCHs except the type-1 PDCCH are not monitored.

It can be seen that, in the implementation, considering that the heartbeat traffic corresponding to the type-1 PDCCH is a small packet service with a long period, the heartbeat traffic needs to be processed differently. Therefore, when the UE needs to monitor only the type-1 PDCCH in the AT, the base station still needs to start the ODT to make the UE monitor other PDCCHs except the type-1 PDCCH in the AT, which will lead to more power consumption of the UE. Therefore, if the wakeup indication is the first value 0, the UE will monitor the type-1 PDCCH, and in this case, the ODT is not started, and other PDCCHs except the type-1 PDCCH are not monitored.

In a possible implementation, the monitor mode for the type-1 PDCCH is determined according to the type-1 wakeup indication as follows. If a value of the type-1 wakeup indication is a first value and a first higher-layer parameter is a first higher-layer parameter value which can also be referred to as a higher-layer parameter value A, it is determined that the monitor mode for the type-1 PDCCH is to monitor the type-1 PDCCH.

The type-1 wakeup indication includes one bit, and the first value is 0. When the value of the type-1 wakeup indication is 0, whether the UE needs to monitor the type-1 PDCCH depends on the first higher-layer parameter, that is, a semi-static signaling. The type-1 wakeup indication is a dynamic signaling, and after the dynamic signaling is received, a behavior of the UE still depends on the semi-static signaling. The first higher-layer parameter includes two values that are a first higher-layer parameter value and a second higher-layer parameter value which can also be referred to as a higher-layer parameter value B. The first higher-layer parameter value corresponds to monitoring and the second higher-layer parameter value corresponds to non-monitoring. Herein, the first higher-layer parameter may be understood as a switch including two states of on and off.

When the first higher-layer parameter is the first higher-layer parameter value, it can be determined that the monitor mode for the type-1 PDCCH is to monitor the type-1 PDCCH.

It can be seen that, in the implementation, when the value of the type-1 wakeup indication is the first value, it is more accurate to determine the monitor mode for the type-1 PDCCH according to the value of the first higher-layer parameter that corresponds to the type-1 PDCCH.

In a possible implementation, the monitor mode for the type-1 PDCCH is determined according to the type-1 wakeup indication as follows. If a value of the type-1 wakeup indication is a first value and a first higher-layer parameter is a second higher-layer parameter value, it is determined that the monitor mode for the type-1 PDCCH is not to monitor the type-1 PDCCH.

The type-1 wakeup indication includes one bit, and the first value is 0. When the value of the type-1 wakeup indication is 0, whether the UE needs to monitor the type-1 PDCCH depends on the first higher-layer parameter, that is, a semi-static signaling. The type-1 wakeup indication is a dynamic signaling, and after the dynamic signaling is received, a behavior of the UE still depends on the semi-static signaling. The first higher-layer parameter includes two values that are a first higher-layer parameter value and a second higher-layer parameter value. The first higher-layer parameter value corresponds to monitoring and the second higher-layer parameter value corresponds to non-monitoring. Herein, the first higher-layer parameter may be understood as a switch including two states of on and off.

When the first higher-layer parameter is the second higher-layer parameter value, it can be determined that the monitor mode for the type-1 PDCCH is not to monitor the type-1 PDCCH.

It can be seen that, in the implementation, when the value of the type-1 wakeup indication is the first value, it is more accurate to determine the monitor mode for the type-1 PDCCH according to the value of the first higher-layer parameter that corresponds to the type-1 PDCCH.

In a possible implementation, the monitor mode for the type-1 PDCCH is determined according to the type-1 wakeup indication as follows. If a value of the type-1 wakeup indication is a first value and a first logical channel priority is greater than or equal to a first threshold which can also be referred to as a threshold A, it is determined that the monitor mode for the type-1 PDCCH is to monitor the type-1 PDCCH.

The type-1 wakeup indication includes one bit, and the first value is 0. When the value of the type-1 wakeup indication is 0, whether the UE needs to monitor the type-1 PDCCH depends on the first logical channel priority. The type-1 wakeup indication is a dynamic signaling, and after the dynamic signaling is received, a behavior of the UE still depends on the first logical channel priority corresponding to the type-1 PDCCH. If the first logical channel priority is greater than or equal to the first threshold, the monitor mode for the type-1 PDCCH is to monitor the type-1 PDCCH.

It can be seen that, in the implementation, when the value of the type-1 wakeup indication is the first value, it is more accurate to determine the monitor mode for the type-1 PDCCH according to the first logical channel priority corresponding to the type-1 PDCCH.

In a possible implementation, the monitor mode for the type-1 PDCCH is determined according to the type-1 wakeup indication as follows. If a value of the type-1 wakeup indication is a first value and a first logical channel priority is less than a first threshold, it is determined that the monitor mode for the type-1 PDCCH is not to monitor the type-1 PDCCH.

The type-1 wakeup indication includes one bit, and the first value is 0. When the value of the type-1 wakeup indication is 0, whether the UE needs to monitor the type-1 PDCCH depends on the first logical channel priority. The type-1 wakeup indication is a dynamic signaling, and after the dynamic signaling is received, a behavior of the UE still depends on the first logical channel priority corresponding to the type-1 PDCCH. If the first logical channel priority is less than the first threshold, the monitor mode for the type-1 PDCCH is not to monitor the type-1 PDCCH.

It can be seen that, in the implementation, when the value of the type-1 wakeup indication is the first value, it is more accurate to determine the monitor mode for the type-1 PDCCH according to the first logical channel priority corresponding to the type-1 PDCCH.

Consistent with the implementation illustrated in FIG. 1, referring to FIG. 2, FIG. 2 is a schematic flowchart illustrating a method for physical layer monitoring provided in implementations of the disclosure, where the method for physical layer monitoring is applied to a UE. As illustrated in FIG. 2, the method for physical layer monitoring includes the following.

S201, determine a monitor mode for a type-1 PDCCH according to a type-2 wakeup indication, where the type-1 PDCCH is a PDCCH for a heartbeat traffic.

A base station may configure a dedicated PDCCH for the heartbeat traffic. The PDCCH is generally configured through a search space set, and thus in fact, the base station may configure a search space set for the heartbeat traffic, and a PDCCH candidate in the search space set may be regarded as the type-1 PDCCH. The type-1 PDCCH described herein may also be equivalent to a type-1 search space set.

The PDCCH or the search space set for the heartbeat traffic may be represented by a parameter in higher-layer parameters of the search space set, that is, the PDCCH or the search space set for the heartbeat traffic is identified by an information element. That is to say, the PDCCH (search space set) for the heartbeat traffic can be distinguished from other PDCCHs (search space sets) through a parameter in the higher-layer parameters of the search space set. In the disclosure, the PDCCH (search space set) for the heartbeat traffic is classified as the type-1 PDCCH (search space set).

The type-2 wakeup indication includes one bit corresponding to the wakeup indication in the DCI format 2-6 plus an additional bit, where the additional bit may be an adjacent bit before or after the bit of the wakeup indication in the DCI format 2-6.

It can be seen that with the method for physical layer monitoring and related apparatuses described in implementations of the disclosure, where the method and the related apparatuses are applied to the UE, the UE determines the monitor mode for the type-1 PDCCH according to the type-2 wakeup indication. Since the wakeup indication and the PDCCH for the heartbeat traffic coexist in a system, and the PDCCH skipping indication and the PDCCH for the heartbeat traffic also coexist in the system, the PDCCH for the heartbeat traffic is classified as the type-1 PDCCH, and the monitor mode for the type-1 PDCCH is further determined, which is conducive to solving the coexistence problem of the wakeup indication and the PDCCH for the heartbeat traffic, and the coexistence problem of the PDCCH skipping indication and the PDCCH for the heartbeat traffic.

In a possible implementation, the monitor mode for the type-1 PDCCH is determined according to the value of the type-2 wakeup indication as follows. If the value of the type-2 wakeup indication is a second value which can also be referred to as a value B, it is determined that the monitor mode for the type-1 PDCCH is to stop a first timer and not to monitor the type-1 PDCCH.

The type-2 wakeup indication includes two bits, where the two bits correspond to four code points in total, so there may be four cases: 00, 01, 11, and 10, where 00, 01, 11, and 10 each may correspond to one monitor mode. Therefore, four monitor modes for the type-1 PDCCH can be determined according to the type-2 wakeup indication. The value of the type-2 wakeup indication is determined first, and then the monitor mode for the type-1 PDCCH is determined according to the value of the type-2 wakeup indication.

It can be seen that, in the implementation, the type-2 wakeup indication includes one bit corresponding to the wakeup indication in the DCI format 2-6 plus an additional bit, so that it is possible to determine whether to start the ODT, and determine the monitor mode for the type-1 PDCCH, according to the value of the type-2 wakeup indication.

In a possible implementation, the monitor mode for the type-1 PDCCH is determined according to the value of the type-2 wakeup indication as follows. If the value of the type-2 wakeup indication is a second value, it is determined that the monitor mode for the type-1 PDCCH is to stop a first timer and not to monitor the type-1 PDCCH.

The second value is 00, and the first timer is an ODT. When the value of the type-2 wakeup indication is 00, it can be determined that the monitor mode for the type-1 PDCCH is to stop the ODT and not to monitor the type-1 PDCCH.

It can be seen that, in the implementation, the type-2 wakeup indication includes one bit corresponding to the wakeup indication in the DCI format 2-6 plus an additional bit, so that it is possible to determine whether to start the ODT, and determine the monitor mode for the type-1 PDCCH, according to the value of the type-2 wakeup indication.

In a possible implementation, the monitor mode for the type-1 PDCCH is determined according to the value of the type-2 wakeup indication as follows. If the value of the type-2 wakeup indication is a third value which can also be referred to as a value C, it is determined that the monitor mode for the type-1 PDCCH is to stop a first timer and monitor the type-1 PDCCH.

The third value is 01, and the first timer is an ODT. When the value of the type-2 wakeup indication is 01, it can be determined that the monitor mode for the type-1 PDCCH is to stop the ODT and monitor the type-1 PDCCH.

It can be seen that, in the implementation, the type-2 wakeup indication includes one bit corresponding to the wakeup indication in the DCI format 2-6 plus an additional bit, so that it is possible to determine whether to start the ODT, and determine the monitor mode for the type-1 PDCCH, according to the value of the type-2 wakeup indication.

In a possible implementation, the monitor mode for the type-1 PDCCH is determined according to the value of the type-2 wakeup indication as follows. If the value of the type-2 wakeup indication is a fourth value which can also be referred to as a value D, it is determined that the monitor mode for the type-1 PDCCH is to start a first timer and monitor the type-1 PDCCH.

The fourth value is 01, and the first timer is an ODT. When the value of the type-2 wakeup indication is 01, it can be determined that the monitor mode for the type-1 PDCCH is to start the ODT and monitor the type-1 PDCCH.

It can be seen that, in the implementation, the type-2 wakeup indication includes one bit corresponding to the wakeup indication in the DCI format 2-6 plus an additional bit, so that it is possible to determine whether to start the ODT, and determine the monitor mode for the type-1 PDCCH, according to the value of the type-2 wakeup indication.

In a possible implementation, the monitor mode for the type-1 PDCCH is determined according to the value of the type-2 wakeup indication as follows. If the value of the type-2 wakeup indication is a fifth value which can also be referred to as a value E, it is determined that the monitor mode for the type-1 PDCCH is to stop a first timer, monitor the type-1 PDCCH, and start an inactivity timer corresponding to the type-1 PDCCH, where the inactivity timer corresponding to the type-1 PDCCH is different from an inactivity timer corresponding to each of other PDCCHs except the type-1 PDCCH.

The fifth value is 10, and the first timer is an ODT. When the value of the type-2 wakeup indication is 00, it can be determined that the monitor mode for the type-1 PDCCH is to stop the ODT, monitor the type-1 PDCCH, and start the inactivity timer corresponding to the type-1 PDCCH, where the inactivity timer corresponding to the type-1 PDCCH is different from an inactivity timer corresponding to each of other PDCCHs except the type-1 PDCCH.

It can be seen that, in the implementation, since the heartbeat traffic corresponding to the type-1 PDCCH is a small packet service, a time for starting the inactive timer is very short, which will not cause great power consumption.

Consistent with the implementations illustrated in FIG. 1 and FIG. 2, referring to FIG. 3, FIG. 3 is a schematic flowchart illustrating a method for physical layer monitoring provided in implementations of the disclosure. As illustrated in FIG. 3, the method for physical layer monitoring includes the following.

S301: determine a monitor mode for a type-1 PDCCH according to a type-1 PDCCH skipping indication, where the type-1 PDCCH is a PDCCH for a heartbeat traffic.

A base station may configure a dedicated PDCCH for the heartbeat traffic. The PDCCH is generally configured through a search space set, and thus in fact, the base station may configure a search space set for the heartbeat traffic, and a PDCCH candidate in the search space set may be regarded as the type-1 PDCCH. The type-1 PDCCH described herein may also be equivalent to a type-1 search space set.

The PDCCH or the search space set for the heartbeat traffic may be represented by a parameter in higher-layer parameters of the search space set, that is, the PDCCH or the search space set for the heartbeat traffic is identified by an information element. That is to say, the PDCCH (search space set) for the heartbeat traffic can be distinguished from other PDCCHs (search space sets) through a parameter in the higher-layer parameters of the search space set. In the disclosure, the PDCCH (search space set) for the heartbeat traffic is classified as the type-1 PDCCH (search space set).

The type-1 PDCCH skipping indication may be a PDCCH skipping indication in a scheduling downlink control information (DCI). The monitor mode for the type-1 PDCCH is determined according to the type-1 PDCCH skipping indication, where the monitor mode includes monitoring and not monitoring the type-1 PDCCH.

It can be seen that with the method for physical layer monitoring and related apparatuses described in implementations of the disclosure, where the method and the related apparatuses are applied to the UE, the UE determines the monitor mode for the type-1 PDCCH according to the type-1 PDCCH skipping indication. Since the wakeup indication and the PDCCH for the heartbeat traffic coexist in a system, and the PDCCH skipping indication and the PDCCH for the heartbeat traffic also coexist in the system, the PDCCH for the heartbeat traffic is classified as the type-1 PDCCH, and the monitor mode for the type-1 PDCCH is further determined, which is conducive to solving the coexistence problem of the wakeup indication and the PDCCH for the heartbeat traffic, and the coexistence problem of the PDCCH skipping indication and the PDCCH for the heartbeat traffic.

In a possible implementation, the monitor mode for the type-1 PDCCH is determined according to the type-1 PDCCH skipping indication as follows. A value of the type-1 PDCCH skipping indication is determined, where the type-1 PDCCH skipping indication includes one bit. If the value of the type-1 PDCCH skipping indication is a sixth value which can also be referred to as a value F, it is determined that the monitor mode for the type-1 PDCCH is to monitor the type-1 PDCCH.

The type-1 PDCCH skipping indication includes one bit, and said one bit of the type-1 PDCCH skipping indication may not act on monitoring of the type-1 PDCCH. In that related art, if the value of the type-1 PDCCH skipping indication is 1, the UE may continue to monitor the type-1 PDCCH. Generally, if the value of the type-1 PDCCH skipping indication is 1, the UE does not monitor the PDCCH (a group of search space sets semi-statically configured) within a duration or an operating time of a timer. However, considering that the heartbeat traffic corresponding to the type-1 PDCCH is a small packet service with a long period, the heartbeat traffic needs to be processed differently. Therefore, when the UE needs to monitor only the type-1 PDCCH within the duration or the operating time of the timer, the base station still does not set the type-1 PDCCH skipping indication to be 1, which will lead to more power consumption of the UE. It is equivalent to that if the type-1 PDCCH skipping indication is to skip PDCCH monitoring, the UE will continue to monitor the type-1 PDCCH.

The value of the type-1 PDCCH skipping indication is the sixth value, and the sixth value is 0 or 1, where the standard is to be determined. When the value of the type-1 PDCCH skipping indication received by the UE is 0 or 1, the UE skips monitoring of PDCCHs except the type-1 PDCCH within a period of time, or modifies a parameter of a search space set corresponding to PDCCHs except the type-1 PDCCH.

It can be seen that, in the implementation, when the value of the type-1 PDCCH skipping indication is the sixth value, it is more accurate to determine the monitor mode for the type-1 PDCCH according to the sixth value.

In a possible implementation, the monitor mode for the type-1 PDCCH is determined according to the type-1

PDCCH skipping indication as follows. If a value of the type-1 PDCCH skipping indication is a sixth value and a second higher-level parameter is a third higher-level parameter value which can also be referred to as a higher-level parameter value C, it is determined that the monitor mode for the type-1 PDCCH is to monitor the type-1 PDCCH.

The type-1 PDCCH skipping indication includes one bit, and the sixth value is 0 or 1. When the value of the type-1 PDCCH skipping indication is 0 or 1, whether the UE needs to monitor the type-1 PDCCH depends on the second higher-layer parameter, that is, a semi-static signaling. The type-1 PDCCH skipping indication is a dynamic signaling, and after the dynamic signaling is received, a behavior of the UE still depends on the semi-static signaling. The second higher-layer parameter includes two values that are a third higher-layer parameter value and a fourth higher-layer parameter value. The third higher-layer parameter value corresponds to monitoring and the fourth higher-layer parameter value corresponds to non-monitoring. Herein, the second higher-layer parameter may be understood as a switch including two states of on and off.

When the second higher-layer parameter is the third higher-layer parameter value, it can be determined that the monitor mode for the type-1 PDCCH is to monitor the type-1 PDCCH.

It can be seen that, in the implementation, when the value of the type-1 PDCCH skipping indication is the sixth value, it is more accurate to determine the monitor mode for the type-1 PDCCH according to the value of the second higher-layer parameter.

In a possible implementation, the monitor mode for the type-1 PDCCH is determined according to the type-1 PDCCH skipping indication as follows. If a value of the type-1 PDCCH skipping indication is a sixth value and a second higher-level parameter is a fourth higher-level parameter value which can also be referred to as a higher-level parameter value D, it is determined that the monitor mode for the type-1 PDCCH is not to monitor the type-1 PDCCH.

The type-1 PDCCH skipping indication includes one bit, and the first value is 0 or 1. When the value of the type-1 PDCCH skipping indication is 0 or 1, whether the UE needs to monitor the type-1 PDCCH depends on the second higher-layer parameter, that is, a semi-static signaling. The type-1 wakeup indication is a dynamic signaling, and after the dynamic signaling is received, a behavior of the UE still depends on the semi-static signaling. The second higher-layer parameter includes two values that are a third higher-layer parameter value and a fourth higher-layer parameter value. The third higher-layer parameter value corresponds to monitoring and the fourth higher-layer parameter value corresponds to non-monitoring. Herein, the second higher-layer parameter may be understood as a switch including two states of on and off.

When the second higher-layer parameter is the fourth higher-layer parameter value, it can be determined that the monitor mode for the type-1 PDCCH is not to monitor the type-1 PDCCH.

It can be seen that, in the implementation, when the value of the type-1 PDCCH skipping indication is the sixth value, it is more accurate to determine the monitor mode for the type-1 PDCCH according to the value of the second higher-layer parameter.

In a possible implementation, the monitor mode for the type-1 PDCCH is determined according to the type-1 PDCCH skipping indication as follows. If a value of the type-1 PDCCH skipping indication is a sixth value and a second logical channel priority is greater than or equal to a second threshold which can also be referred to as a threshold B, it is determined that the monitor mode for the type-1 PDCCH is to monitor the type-1 PDCCH.

The type-1 PDCCH skipping indication includes one bit, and the first value is 0 or 1. When the value of the type-1 PDCCH skipping indication is 0 or 1, whether the UE needs to monitor the type-1 PDCCH depends on the second logical channel priority. The type-1 PDCCH skipping indication is dynamic signaling, and after the dynamic signaling is received, a behavior of the UE still depends on the second logical channel priority corresponding to the type-1 PDCCH. If the second logical channel priority is greater than or equal to the second threshold, the monitor mode for the type-1 PDCCH is to monitor the type-1 PDCCH.

It can be seen that, in the implementation, when the value of the type-1 PDCCH skipping indication is the sixth value, it is more accurate to determine the monitor mode for the type-1 PDCCH according to the second logical channel priority.

In a possible implementation, the monitor mode for the type-1 PDCCH is determined according to the type-1 PDCCH skipping indication as follows. If a value of the type-1 PDCCH skipping indication is a sixth value and a second logical channel priority is less than a second threshold, it is determined that the monitor mode for the type-1 PDCCH is not to monitor the type-1 PDCCH.

The type-1 PDCCH skipping indication includes one bit, and the first value is 0 or 1. When the value of the type-1 PDCCH skipping indication is 0 or 1, whether the UE needs to monitor the type-1 PDCCH depends on the second logical channel priority. The type-1 PDCCH skipping indication is dynamic signaling, and after the dynamic signaling is received, a behavior of the UE still depends on the second logical channel priority corresponding to the type-1 PDCCH. If the second logical channel priority is less than the second threshold, the monitor mode for the type-1 PDCCH is not to monitor the type-1 PDCCH.

It can be seen that, in the implementation, when the value of the type-1 PDCCH skipping indication is the sixth value, it is more accurate to determine the monitor mode for the type-1 PDCCH according to the second logical channel priority.

Consistent with the implementations illustrated in FIG. 1, FIG. 2, and FIG. 3, referring to FIG. 4, FIG. 4 is a schematic flowchart illustrating a method for physical layer monitoring provided in implementations of the disclosure. As illustrated in FIG. 4, the method for physical layer monitoring includes the following.

S401: determine a monitor mode for a type-1 PDCCH according to a type-2 PDCCH skipping indication, where the type-1 PDCCH is a PDCCH for a heartbeat traffic.

A base station may configure a dedicated PDCCH for the heartbeat traffic. The PDCCH is generally configured through a search space set, and thus in fact, the base station may configure a search space set for the heartbeat traffic, and a PDCCH candidate in the search space set may be regarded as the type-1 PDCCH. The type-1 PDCCH described herein may also be equivalent to a type-1 search space set.

The PDCCH or the search space set for the heartbeat traffic may be represented by a parameter in higher-layer parameters of the search space set, that is, the PDCCH or the search space set for the heartbeat traffic is identified by an information element. That is to say, the PDCCH (search space set) for the heartbeat traffic can be distinguished from other PDCCHs (search space sets) through a parameter in the higher-layer parameters of the search space set. In the disclosure, the PDCCH (search space set) for the heartbeat traffic is classified as the type-1 PDCCH (search space set).

The type 2-PDCCH skipping indication may include one bit corresponding to the PDCCH skipping indication in the scheduling transmission configuration indicator DCI plus an additional bit, where the additional bit may be an adjacent bit before or after the bit corresponding to the PDCCH skipping indication in the scheduling DCI.

It can be seen that with the method for physical layer monitoring and related apparatuses described in implementations of the disclosure, where the method and the related apparatuses are applied to the UE, the UE determines the monitor mode for the type-1 PDCCH according to the type-2 PDCCH skipping indication. Since the wakeup indication and the PDCCH for the heartbeat traffic coexist in a system, and the PDCCH skipping indication and the PDCCH for the heartbeat traffic also coexist in the system, the PDCCH for the heartbeat traffic is classified as the type-1 PDCCH, and the monitor mode for the type-1 PDCCH is further determined, which is conducive to solving the coexistence problem of the wakeup indication and the PDCCH for the heartbeat traffic, and the coexistence problem of the PDCCH skipping indication and the PDCCH for the heartbeat traffic.

In a possible implementation, the monitor mode for the type-1 PDCCH is determined according to the value of the type-2 PDCCH skipping indication as follows. If the value of the type-2 PDCCH skipping indication is a seventh value which can also be referred to as a value G, it is determined that the monitor mode for the type-1 PDCCH is not to monitor a PDCCH, where the PDCCH includes the type-1 PDCCH.

The type-2 skipping indication includes two bits, and a value corresponding to the two bits may be 00, 01, 11, or 10. The value of the type-2 skipping indication is determined first, and then the monitor mode for the type-1 PDCCH is determined according to the value of the type-2 skipping indication.

It can be seen that, in the implementation, the type-2 PDCCH skipping indication may include one bit corresponding to the PDCCH skipping indication in the scheduling transmission configuration indicator DCI plus an additional bit, so that the monitor mode for the type-1 PDCCH can be determined according to the value of the type-2 PDCCH skipping indication.

In a possible implementation, the monitor mode for the type-1 PDCCH is determined according to the value of the type-2 PDCCH skipping indication as follows. If the value of the type-2 wakeup indication is a seventh value, it is determined that the monitor mode for the type-1 PDCCH is not to monitor a PDCCH, where the PDCCH includes the type-1 PDCCH.

The seventh value is 00, and when the value of the type-2 PDCCH skipping indication is it can be determined that the monitor mode for the type-1 PDCCH is not to monitor the PDCCH, where the PDCCH includes the type-1 PDCCH.

It can be seen that, in the implementation, the type-2 PDCCH skipping indication may include one bit corresponding to the PDCCH skipping indication in the scheduling transmission configuration indicator DCI plus an additional bit, so that the monitor mode for the type-1 PDCCH can be determined according to the value of the type-2 PDCCH skipping indication.

In a possible implementation, the monitor mode for the type-1 PDCCH is determined according to the value of the type-2 PDCCH skipping indication as follows. If the value of the type-2 wakeup indication is an eighth value which can also be referred to as a value H, it is determined that the monitor mode for the type-1 PDCCH is not to monitor a PDCCH within a configured duration, where the PDCCH includes the type-1 PDCCH.

The eighth value is 01, and when the value of the type-2 PDCCH skipping indication is 01, it can be determined that the monitor mode for the type-1 PDCCH is not to monitor the PDCCH within the configured duration, where the PDCCH includes the type-1 PDCCH.

It can be seen that, in the implementation, the type-2 PDCCH skipping indication may include one bit corresponding to the PDCCH skipping indication in the scheduling transmission configuration indicator DCI plus an additional bit, so that the monitor mode for the type-1 PDCCH can be determined according to the value of the type-2 PDCCH skipping indication.

In a possible implementation, the monitor mode for the type-1 PDCCH is determined according to the value of the type-2 PDCCH skipping indication as follows. If the value of the type-2 wakeup indication is a ninth value which can also be referred to as a value I, it is determined that the monitor mode for the type-1 PDCCH is not to monitor other PDCCHs except the type-1 PDCCH within a configured duration.

The ninth value is 11, and when the value of the type-2 PDCCH skipping indication is 11, it can be determined that the monitor mode for the type-1 PDCCH is not to monitor other PDCCHs except the type-1 PDCCH within the configured duration.

It can be seen that, in the implementation, since the heartbeat traffic corresponding to the type-1 PDCCH is a small packet service, a time for starting the inactive timer is very short, which will not cause great power consumption.

Consistent with the above implementation, referring to FIG. 5, FIG. 5 is a schematic structural diagram of a UE 500 provided in implementations of the disclosure. As illustrated in FIG. 5, the UE 500 includes a processor 510, a memory 520, a communication interface 530, and one or more programs 521. The one or more programs 521 are stored in the memory 520 and configured to be executed by the processor 510. In implementations of the disclosure, the above programs include instructions configured to: determine a monitor mode for a type-1 PDCCH according to a type-1 wakeup indication; or determine the monitor mode for the type-1 PDCCH according to a type-2 wakeup indication; or determine the monitor mode for the type-1 PDCCH according to a type-1 PDCCH skipping indication; or determine the monitor mode for the type-1 PDCCH according to a type-2 PDCCH skipping indication.

It can be seen that with the method for physical layer monitoring and the related apparatuses described in implementations of the disclosure, where the method and the related apparatuses are applied to the UE, the UE determines the monitor mode for the type-1 PDCCH according to the type-1 wakeup indication, or determines the monitor mode for the type-1 PDCCH according to the type-2 wakeup indication, or determines the monitor mode for the type-1 PDCCH according to the type-1 PDCCH skipping indication, or determines the monitor mode for the type-1 PDCCH according to the type-2 PDCCH skipping indication. Since the wakeup indication and a PDCCH for the heartbeat traffic coexist in a system, and the PDCCH skipping indication and the PDCCH for the heartbeat traffic also coexist in the system, the PDCCH for the heartbeat traffic is classified as the type-1 PDCCH, and the monitor mode for the type-1 PDCCH is further determined, which is conducive to solving the coexistence problem of the wakeup indication and the PDCCH for the heartbeat traffic, and the coexistence problem of the PDCCH skipping indication and the PDCCH for the heartbeat traffic.

In a possible implementation, the type-1 PDCCH is a PDCCH for a heartbeat traffic.

In a possible implementation, in terms of determining the monitor mode for the type-1 PDCCH according to the type-1 wakeup indication, the above programs include instructions configured to: determine a value of the type-1 wakeup indication, where the type-1 wakeup indication includes one bit; and determine that the monitor mode for the type-1 PDCCH is to monitor the type-1 PDCCH, if the value of the type-1 wakeup indication is a first value.

In a possible implementation, in terms of determining the monitor mode for the type-1 PDCCH according to the type-1 wakeup indication, the above programs include instructions configured to determine that the monitor mode for the type-1 PDCCH is to monitor the type-1 PDCCH, if a value of the type-1 wakeup indication is a first value and a first higher-layer parameter is a first higher-layer parameter value.

In a possible implementation, in terms of determining the monitor mode for the type-1 PDCCH according to the type-1 wakeup indication, the above programs include instructions configured to determine that the monitor mode for the type-1 PDCCH is not to monitor the type-1 PDCCH, if a value of the type-1 wakeup indication is a first value and a first higher-layer parameter is a second higher-layer parameter value.

In a possible implementation, in terms of determining the monitor mode for the type-1 PDCCH according to the type-1 wakeup indication, the above programs include instructions configured to determine that the monitor mode for the type-1 PDCCH is to monitor the type-1 PDCCH, if a value of the type-1 wakeup indication is a first value and a value of a first logical channel priority is greater than or equal to a first threshold.

In a possible implementation, in terms of determining the monitor mode for the type-1 PDCCH according to the type-1 wakeup indication, the above programs include instructions configured to determine that the monitor mode for the type-1 PDCCH is not to monitor the type-1 PDCCH, if a value of the type-1 wakeup indication is a first value and a first logical channel priority is less than a first threshold.

In a possible implementation, in terms of determining the monitor mode for the type-1 PDCCH according to the type-2 wakeup indication, the above programs include instructions configured to: determine a value of the type-2 wakeup indication, where the type-2 wakeup indication includes two bits; and determine the monitor mode for the type-1 PDCCH according to the value of the type-2 wakeup indication.

In a possible implementation, in terms of determining the monitor mode for the type-1 PDCCH according to the value of the type-2 wakeup indication, the above programs include instructions configured to determine that the monitor mode for the type-1 PDCCH is to stop a first timer and not to monitor the type-1 PDCCH, if the value of the type-2 wakeup indication is a second value.

In a possible implementation, in terms of determining the monitor mode for the type-1 PDCCH according to the value of the type-2 wakeup indication, the above programs include instructions configured to determine that the monitor mode for the type-1 PDCCH is to stop a first timer and monitor the type-1 PDCCH, if the value of the type-2 wakeup indication is a third value.

In a possible implementation, in terms of determining the monitor mode for the type-1 PDCCH according to the value of the type-2 wakeup indication, the above programs include instructions configured to determine that the monitor mode for the type-1 PDCCH is to start a first timer and monitor the type-1 PDCCH, if the value of the type-2 wakeup indication is a fourth value.

In a possible implementation, in terms of determining the monitor mode for the type-1 PDCCH according to the value of the type-2 wakeup indication, the above programs include instructions configured to determine that the monitor mode for the type-1 PDCCH is to stop a first timer, monitor the type-1 PDCCH, and start an inactivity timer corresponding to the type-1 PDCCH, if the value of the type-2 wakeup indication is a fifth value, where the inactivity timer corresponding to the type-1 PDCCH is different from an inactivity timer corresponding to each of other PDCCHs except the type-1 PDCCH.

In a possible implementation, in terms of determining the monitor mode for the type-1 PDCCH according to the type-1 PDCCH skipping indication, the above programs include instructions configured to: determine a value of the type-1 PDCCH skipping indication, where the type-1 PDCCH skipping indication includes one bit; and determine that the monitor mode for the type-1 PDCCH is to monitor the type-1 PDCCH, if the value of the type-1 PDCCH skipping indication is a sixth value.

In a possible implementation, in terms of determining the monitor mode for the type-1 PDCCH according to the type-1 PDCCH skipping indication, the above programs include instructions configured to determine that the monitor mode for the type-1 PDCCH is to monitor the type-1 PDCCH, if a value of the type-1 PDCCH skipping indication is a sixth value and a second higher-level parameter is a third higher-level parameter value.

In a possible implementation, in terms of determining the monitor mode for the type-1 PDCCH according to the type-1 PDCCH skipping indication, the above programs include instructions configured to determine that the monitor mode for the type-1 PDCCH is not to monitor the type-1 PDCCH, if a value of the type-1 PDCCH skipping indication is a sixth value and a second higher-level parameter is a fourth higher-level parameter value.

In a possible implementation, in terms of determining the monitor mode for the type-1 PDCCH according to the type-1 PDCCH skipping indication, the above programs include instructions configured to determine that the monitor mode for the type-1 PDCCH is to monitor the type-1 PDCCH, if a value of the type-1 PDCCH skipping indication is a sixth value and a second logical channel priority is greater than or equal to a second threshold.

In a possible implementation, in terms of determining the monitor mode for the type-1 PDCCH according to the type-1 PDCCH skipping indication, the above programs include instructions configured to determine that the monitor mode for the type-1 PDCCH is not to monitor the type-1 PDCCH, if a value of the type-1 PDCCH skipping indication is a sixth value and a second logical channel priority is less than a second threshold.

In a possible implementation, in terms of determining the monitor mode for the type-1 PDCCH according to the type-2 PDCCH skipping indication, the above programs include instructions configured to: determine a value of the type-2 PDCCH skipping indication, where the type-2 PDCCH skipping indication includes two bits; and determine the monitor mode for the type-1 PDCCH according to the value of the type-2 PDCCH skipping indication.

In a possible implementation, in terms of determining the monitor mode for the type-1 PDCCH according to the value of the type-2 PDCCH skipping indication, the above programs include instructions configured to determine that the monitor mode for the type-1 PDCCH is not to monitor a PDCCH, where the PDCCH includes the type-1 PDCCH, if the value of the type-2 wakeup indication is a seventh value.

In a possible implementation, in terms of determining the monitor mode for the type-1 PDCCH according to the value of the type-2 PDCCH skipping indication, the above programs include instructions configured to determine that the monitor mode for the type-1 PDCCH is not to monitor a PDCCH within a configured duration, where the PDCCH includes the type-1 PDCCH, if the value of the type-2 wakeup indication is an eighth value.

In a possible implementation, in terms of determining the monitor mode for the type-1 PDCCH according to the value of the type-2 PDCCH skipping indication, the above programs include instructions configured to determine that the monitor mode for the type-1 PDCCH is not to monitor other PDCCHs except the type-1 PDCCH within a configured duration, if the value of the type-2 wakeup indication is a ninth value.

The foregoing solutions of the implementations of the disclosure are mainly introduced from the viewpoint of execution of the method side. It can be understood that, in order to implement the above functions, the UE includes hardware structures and/or software modules for performing the respective functions. Those skilled in the art should easily recognize that, in combination with the units and algorithmic operations of various examples illustrated in the implementations provided herein, the disclosure can be implemented in hardware or a combination of the hardware and computer software. Whether a function is implemented by way of the hardware or hardware driven by the computer software depends on the particular application and design constraints of the technical solution. Those skilled in the art may use different methods to implement the illustrated functions for each particular application, but such implementations should not be considered as beyond the scope of the disclosure.

According to the implementations of the disclosure, division of functional units may be performed for the UE in accordance with the foregoing method examples. For example, each functional unit may be divided according to each function, and two or more functions may be integrated in one processing unit. The above-mentioned integrated unit can be implemented in the form of hardware or software program modules. It should be noted that the division of units in the implementations of the disclosure is schematic, and is merely a logical function division, and there may be other division manners in actual implementations.

Figure 6:
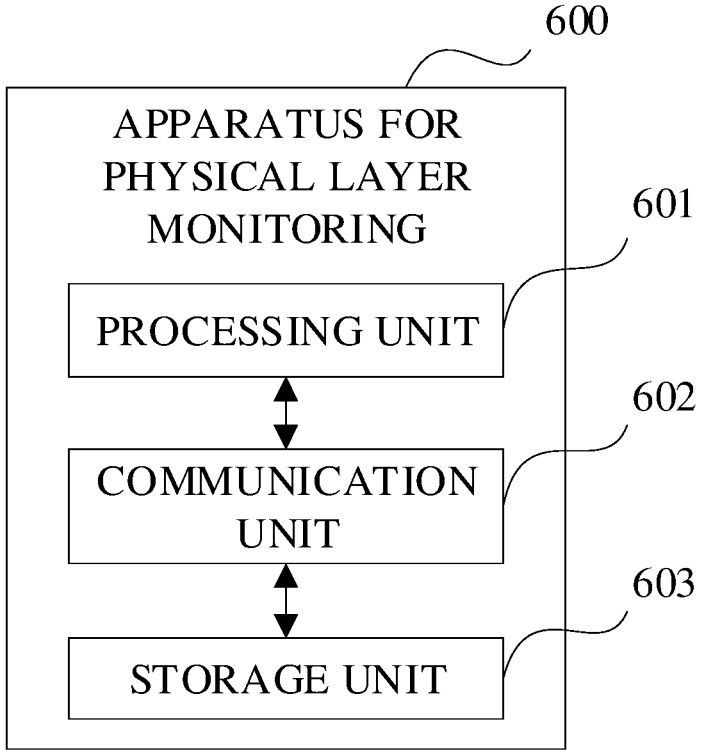
FIG. 6 is a schematic block diagram of functional units of an apparatus for physical layer monitoring provided in implementations of the disclosure.

FIG. 6 is a schematic block diagram of functional units of an apparatus 600 for physical layer monitoring provided in implementations of the disclosure. The apparatus 600 for physical layer monitoring is applied to a UE and includes a communication unit 602 and a processing unit 601. The processing unit 601 is configured to: determine a monitor mode for a PDCCH according to a type-1 wakeup indication; or determine the monitor mode for the type-1 PDCCH according to a type-2 wakeup indication; or determine the monitor mode for the type-1 PDCCH according to a type-1 PDCCH skipping indication; or determine the monitor mode for the type-1 PDCCH according to a type-2 PDCCH skipping indication.

It can be seen that with the method for physical layer monitoring and the related apparatuses described in implementations of the disclosure, where the method and the related apparatuses are applied to the UE, the UE determines the monitor mode for the type-1 PDCCH according to the type-1 wakeup indication, or determines the monitor mode for the type-1 PDCCH according to the type-2 wakeup indication, or determines the monitor mode for the type-1 PDCCH according to the type-1 PDCCH skipping indication, or determines the monitor mode for the type-1 PDCCH according to the type-2 PDCCH skipping indication. Since the wakeup indication and a PDCCH for the heartbeat traffic coexist in a system, and the PDCCH skipping indication and the PDCCH for the heartbeat traffic also coexist in the system, the PDCCH for the heartbeat traffic is classified as the type-1 PDCCH, and the monitor mode for the type-1 PDCCH is further determined, which is conducive to solving the coexistence problem of the wakeup indication and the PDCCH for the heartbeat traffic, and the coexistence problem of the PDCCH skipping indication and the PDCCH for the heartbeat traffic.

In a possible implementation, the type-1 PDCCH is a PDCCH for a heartbeat traffic.

In a possible implementation, the processing unit 601 configured to determine the monitor mode for the type-1 PDCCH according to the type-1 wakeup indication is specifically configured to: determine a value of the type-1 wakeup indication, where the type-1 wakeup indication includes one bit; and determine that the monitor mode for the type-1 PDCCH is to monitor the type-1 PDCCH, if the value of the type-1 wakeup indication is a first value.

In a possible implementation, the processing unit 601 configured to determine the monitor mode for the type-1 PDCCH according to the type-1 wakeup indication is specifically configured to determine that the monitor mode for the type-1 PDCCH is to monitor the type-1 PDCCH, if a value of the type-1 wakeup indication is a first value and a first higher-layer parameter is a first higher-layer parameter value.

In a possible implementation, the processing unit 601 configured to determine the monitor mode for the type-1 PDCCH according to the type-1 wakeup indication is specifically configured to determine that the monitor mode for the type-1 PDCCH is not to monitor the type-1 PDCCH, if a value of the type-1 wakeup indication is a first value and a first higher-layer parameter is a second higher-layer parameter value.

In a possible implementation, the processing unit 601 configured to determine the monitor mode for the type-1 PDCCH according to the type-1 wakeup indication is specifically configured to determine that the monitor mode for the type-1 PDCCH is to monitor the type-1 PDCCH, if a value of the type-1 wakeup indication is a first value and a first logical channel priority is greater than or equal to a first threshold.

In a possible implementation, the processing unit 601 configured to determine the monitor mode for the type-1 PDCCH according to the type-1 wakeup indication is specifically configured to determine that the monitor mode for the type-1 PDCCH is not to monitor the type-1 PDCCH, if a value of the type-1 wakeup indication is a first value and a first logical channel priority is less than a first threshold.

In a possible implementation, the processing unit 601 configured to determine the monitor mode for the type-1 PDCCH according to the type-2 wakeup indication is specifically configured to: determine a value of the type-2 wakeup indication, where the type-2 wakeup indication includes two bits; and determine the monitor mode for the type-1 PDCCH according to the value of the type-2 wakeup indication.

In a possible implementation, the processing unit 601 configured to determine the monitor mode for the type-1

PDCCH according to the value of the type-2 wakeup indication is specifically configured to determine that the monitor mode for the type-1 PDCCH is to stop a first timer and not to monitor the type-1 PDCCH, if the value of the type-2 wakeup indication is a second value.

In a possible implementation, the processing unit 601 configured to determine the monitor mode for the type-1 PDCCH according to the value of the type-2 wakeup indication is specifically configured to determine that the monitor mode for the type-1 PDCCH is to stop a first timer and monitor the type-1 PDCCH, if the value of the type-2 wakeup indication is a third value.

In a possible implementation, the processing unit 601 configured to determine the monitor mode for the type-1 PDCCH according to the value of the type-2 wakeup indication is specifically configured to determine that the monitor mode for the type-1 PDCCH is to start a first timer and monitor the type-1 PDCCH, if the value of the type-2 wakeup indication is a fourth value.

In a possible implementation, the processing unit 601 configured to determine the monitor mode for the type-1 PDCCH according to the value of the type-2 wakeup indication is specifically configured to determine that the monitor mode for the type-1 PDCCH is to stop a first timer, monitor the type-1 PDCCH, and start an inactivity timer corresponding to the type-1 PDCCH, if the value of the type-2 wakeup indication is a fifth value, where the inactivity timer corresponding to the type-1 PDCCH is different from an inactivity timer corresponding to each of other PDCCHs except the type-1 PDCCH.

In a possible implementation, the processing unit 601 configured to determine the monitor mode for the type-1 PDCCH according to the type-1 PDCCH skipping indication is specifically configured to: determine a value of the type-1 PDCCH skipping indication, where the type-1 PDCCH skipping indication includes one bit; and determine that the monitor mode for the type-1 PDCCH is to monitor the type-1 PDCCH, if the value of the type-1 PDCCH skipping indication is a sixth value.

In a possible implementation, the processing unit 601 configured to determine the monitor mode for the type-1 PDCCH according to the type-1 PDCCH skipping indication is specifically configured to determine that the monitor mode for the type-1 PDCCH is to monitor the type-1 PDCCH, if a value of the type-1 PDCCH skipping indication is a sixth value and a second higher-level parameter is a third higher-level parameter value.

In a possible implementation, the processing unit 601 configured to determine the monitor mode for the type-1 PDCCH according to the type-1 PDCCH skipping indication is specifically configured to determine that the monitor mode for the type-1 PDCCH is not to monitor the type-1 PDCCH, if a value of the type-1 PDCCH skipping indication is a sixth value and a second higher-level parameter is a fourth higher-level parameter value.

In a possible implementation, the processing unit 601 configured to determine the monitor mode for the type-1 PDCCH according to the type-1 PDCCH skipping indication is specifically configured to determine that the monitor mode for the type-1 PDCCH is to monitor the type-1 PDCCH, if a value of the type-1 PDCCH skipping indication is a sixth value and a second logical channel priority is greater than or equal to a second threshold.

In a possible implementation, the processing unit 601 configured to determine the monitor mode for the type-1 PDCCH according to the type-1 PDCCH skipping indication is specifically configured to determine that the monitor mode for the type-1 PDCCH is not to monitor the type-1 PDCCH, if a value of the type-1 PDCCH skipping indication is a sixth value and a second logical channel priority is less than a second threshold.

In a possible implementation, the processing unit 601 configured to determine the monitor mode for the type-1 PDCCH according to the type-2 PDCCH skipping indication is specifically configured to: determine a value of the type-2 PDCCH skipping indication, where the type-2 PDCCH skipping indication includes two bits; and determine the monitor mode for the type-1 PDCCH according to the value of the type-2 PDCCH skipping indication.

In a possible implementation, the processing unit 601 configured to determine the monitor mode for the type-1 PDCCH according to the value of the type-2 PDCCH skipping indication is specifically configured to determine that the monitor mode for the type-1 PDCCH is not to monitor a PDCCH, where the PDCCH includes the type-1 PDCCH, if the value of the type-2 wakeup indication is a seventh value.

In a possible implementation, the processing unit 601 configured to determine the monitor mode for the type-1 PDCCH according to the value of the type-2 PDCCH skipping indication is specifically configured to determine that the monitor mode for the type-1 PDCCH is not to monitor a PDCCH within a configured duration, where the PDCCH includes the type-1 PDCCH, if the value of the type-2 wakeup indication is an eighth value.

In a possible implementation, the processing unit 601 configured to determine the monitor mode for the type-1 PDCCH according to the value of the type-2 PDCCH skipping indication is specifically configured to determine that the monitor mode for the type-1 PDCCH is not to monitor other PDCCHs except the type-1 PDCCH within a configured duration, if the value of the type-2 wakeup indication is a ninth value.

The electronic device may further include a storage unit 603, where the processing unit 601 and the communication unit 602 may be a controller or a processor, and the storage unit 603 may be a memory.

It may be understood that functions of program modules of the apparatus for physical layer monitoring in the implementation may be specifically implemented according to the methods in the foregoing method implementations. For a specific implementation process, reference can be made to the related description of the foregoing method implementations, which will not be repeated herein.

A non-transitory computer-readable storage medium is further provided in implementations of the disclosure. The computer storage medium stores computer programs for electronic data interchange (EDI), where the computer programs are operable with a computer to perform part or all of the operations of any one of the methods described in the foregoing method implementations. The computer includes a UE.

A computer program product is further provided in implementations of the disclosure. The computer program product includes a non-transitory computer-readable storage medium that stores computer programs. The computer programs are operable with a computer to perform part or all of the operations of any one of the methods described in the foregoing method implementations. The computer program product may be a software installation package. The computer includes a UE.

It is to be noted that for the sake of simplicity, the foregoing method implementations are described as a series of action combinations. However, it will be appreciated by those skilled in the art that the disclosure is not limited by the sequence of actions described. According to the disclosure, some operations may be performed in other orders or simultaneously. Besides, it will be appreciated by those skilled in the art that the implementations described in the specification are preferred implementations, and the actions and modules involved are not necessarily essential to the disclosure.

In the foregoing implementations, the description of each implementation has its own emphasis. For the parts not described in detail in one implementation, reference may be made to related descriptions in other implementations.

In several implementations provided in the disclosure, it will be appreciated that the apparatuses disclosed may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interfaces, apparatuses, or units, and may be electrical, or otherwise.

Units illustrated as separated parts may or may not be physically separated. Components or parts displayed as units may or may not be physical units, and may reside at one location or may be distributed to multiple network units. Part of or all of the units may be selectively adopted according to practical needs to achieve desired objectives of the solutions of implementations.

In addition, various functional units described in various implementations of the disclosure may be integrated into one processing unit or may be presented as a number of physically separated units, and two or more units may be integrated into one unit. The integrated unit may be implemented by a form of hardware or a software functional unit.

If the integrated units are implemented as software functional units and sold or used as standalone products, they may be stored in a computer-readable memory. According to such an understanding, the essential technical solution, or the portion that contributes to the related art, or all or part of the technical solution of the disclosure may be expressed as software products. The computer software products can be stored in a memory and may include multiple instructions that, when executed, can cause a computer device (e.g., a personal computer, a server, a network device, etc.) to execute all or part of operations of the methods described in various implementations of the disclosure. The above memory may include various kinds of media that can store program codes, such as a universal serial bus (USB) flash disk, a read-only memory (ROM), a random access memory (RAM), a mobile hard disc, a magnetic disk, or an optical disk.

It will be understood by those of ordinary skill in the art that all or part of the operations of the various methods in the implementations described above may be accomplished by means of a program to instruct associated hardware, and the program may be stored in a computer-readable memory, which may include a flash disk, an ROM, an RAM, a magnetic disk, or an optical disk.

The above implementations in the disclosure are introduced in detail. Principles and implementation manners of the disclosure are elaborated with specific implementations herein. The illustration of implementations above is only used to help understanding of methods and core ideas of the disclosure. At the same time, for those of ordinary skill in the art, according to ideas of the disclosure, there will be changes in the specific implementation manners and application scope. In summary, contents of this specification should not be understood as limitation on the disclosure.

What is claimed is:

1. A method for physical layer monitoring, applied to a user equipment (UE) and comprising:

determining a monitor mode for a type-1 physical down-link control channel (PDCCH) according to a type-1 wakeup indication; and performing monitoring on the type-1 PDCCH, wherein determining the monitor mode for the type-1 PDCCH according to the type-1 wakeup indication comprises:

determining a value of the type-1 wakeup indication, wherein the type-1 wakeup indication comprises one bit; and if the value of the type-1 wakeup indication is a value A and a higher-layer parameter is a higher-layer parameter value A, determining that the monitor mode for the type-1 PDCCH is to monitor the type-1 PDCCH; or if the value of the type-1 wakeup indication is the value A and the higher-layer parameter is a higher-layer parameter value B, determining that the monitor mode for the type-1 PDCCH is not to monitor the type-1 PDCCH.

2. The method of claim 1, wherein determining the monitor mode for the type-1 PDCCH according to the type-1 wakeup indication further comprises:

if the value of the type-1 wakeup indication is the value A and a value of a logical channel priority is greater than or equal to a threshold A, determining that the monitor mode for the type-1 PDCCH is to monitor the type-1 PDCCH; or if the value of the type-1 wakeup indication is the value A and the value of the logical channel priority is less than the threshold A, determining that the monitor mode for the type-1 PDCCH is not to monitor the type-1 PDCCH.

3. The method of claim 1, wherein the type-1 PDCCH is a PDCCH for a heartbeat traffic.

4. A user equipment (UE), comprising a processor, a memory, a communication interface, and one or more programs, wherein the one or more programs are stored in the memory and configured to be executed by the processor, and the one or more programs comprise instructions configured to perform:

if a value of a type-1 wakeup indication is a value A and a value of a logical channel priority is greater than or equal to a threshold A, determining that a monitor mode for a type-1 physical downlink control channel (PDCCH) is to monitor the type-1 PDCCH; or if the value of the type-1 wakeup indication is the value A and the value of the logical channel priority is less than the threshold A, determining that the monitor mode for the type-1 PDCCH is not to monitor the type-1 PDCCH; and performing monitoring on the type-1 PDCCH.

5. The UE of claim 4, wherein the type-1 PDCCH is a PDCCH for a heartbeat traffic.

6. A user equipment (UE), comprising a processor, a memory, a communication interface, and one or more programs, wherein the one or more programs are stored in the memory and configured to be executed by the processor, and the one or more programs comprise instructions configured to perform:

determining a value of a type-2 wakeup indication, wherein the type-2 wakeup indication comprises two bits;

determining a monitor mode for a type-1 physical down-link control channel (PDCCH) according to the value of the type-2 wakeup indication; and performing monitoring on the type-1 PDCCH, wherein determining the monitor mode for the type-1 PDCCH according to the value of the type-2 wakeup indication comprises:

when the value of the type-2 wakeup indication is a value E, determining that the monitor mode for the type-1 PDCCH is to stop a timer, monitor the type-1 PDCCH, and start an inactivity timer corresponding to the type-1 PDCCH, wherein the inactivity timer corresponding to the type-1 PDCCH is different from an inactivity timer corresponding to each of other PDCCHs except the type-1 PDCCH.

7. The UE of claim 6, wherein in terms of determining the monitor mode for the type-1 PDCCH according to the value of the type-2 wakeup indication, the one or more programs further comprise instructions configured to perform:

if the value of the type-2 wakeup indication is a value B, determining that the monitor mode for the type-1 PDCCH is to stop a timer and not to monitor the type-1 PDCCH.

8. The UE of claim 6, wherein in terms of determining the monitor mode for the type-1 PDCCH according to the value of the type-2 wakeup indication, the one or more programs further comprise instructions configured to perform:

if the value of the type-2 wakeup indication is a value C, determining that the monitor mode for the type-1 PDCCH is to stop a timer and monitor the type-1 PDCCH.

9. The UE of claim 6, wherein in terms of determining the monitor mode for the type-1 PDCCH according to the value of the type-2 wakeup indication, the one or more programs further comprise instructions configured to perform:

if the value of the type-2 wakeup indication is a value D, determining that the monitor mode for the type-1 PDCCH is to start a timer and monitor the type-1 PDCCH.

10. The UE of claim 6, wherein the type-1 PDCCH is a PDCCH for a heartbeat traffic.

* * * * *